United States Patent [19]

Ryu et al.

[11] Patent Number: 5,631,308
[45] Date of Patent: May 20, 1997

[54] ANTI-FOULING PAINT COMPOSITION

[75] Inventors: Jae H. Ryu, Seoul; Moon Y. Lee, Kyunggi-do; Bum S. Kim, Kyunggi-do; Duk H. Kim, Kyunggi-do, all of Rep. of Korea

[73] Assignee: Korea Chemical Co., Ltd., Kyeongsangnam-do, Rep. of Korea

[21] Appl. No.: 599,228

[22] Filed: Feb. 9, 1996

[30] Foreign Application Priority Data

Dec. 30, 1995 [KR] Rep. of Korea ............... 69081/1995

[51] Int. Cl.$^6$ ............................................................ C09D 5/14
[52] U.S. Cl. .................... 523/122; 523/177; 106/15.05; 525/330.2
[58] Field of Search ........................ 523/122, 177; 525/330.2, 330.6

[56] References Cited

U.S. PATENT DOCUMENTS

| | | | |
|---|---|---|---|
| 3,167,473 | 1/1965 | Leebrick | 523/122 |
| 4,774,080 | 9/1988 | Yamamori et al. | 525/330.2 |
| 4,820,748 | 4/1989 | Yamamori et al. | 523/122 |
| 4,914,141 | 4/1990 | Matsuo et al. | 523/122 |
| 5,199,977 | 4/1993 | Yamamori et al. | 525/386 |

FOREIGN PATENT DOCUMENTS

| | | |
|---|---|---|
| 204456 | 12/1986 | European Pat. Off. . |
| 471204 | 2/1992 | European Pat. Off. . |
| 53-21885 | 7/1978 | Japan . |
| 58-67722 | 4/1983 | Japan . |
| 60-88033 | 5/1985 | Japan . |
| 1457590 | 12/1976 | United Kingdom . |
| WO91/15546 | 10/1991 | WIPO . |

*Primary Examiner*—Tae Yoon
*Attorney, Agent, or Firm*—Lowe, Price, LeBlanc & Becker

[57] ABSTRACT

An anti-fouling paint comprising a self-polishing copolymer which contains at least one side-chain bearing an organic half-ester at one terminal group exhibits an improved anti-fouling property, storage stability, and resists the cracking, peeling, and flaking problems which usually occur in paint film during long-term exposure. In particular, the use of such paint shows excellent adhesion properties on pre-coated, tin-based anti-fouling paint.

5 Claims, 1 Drawing Sheet

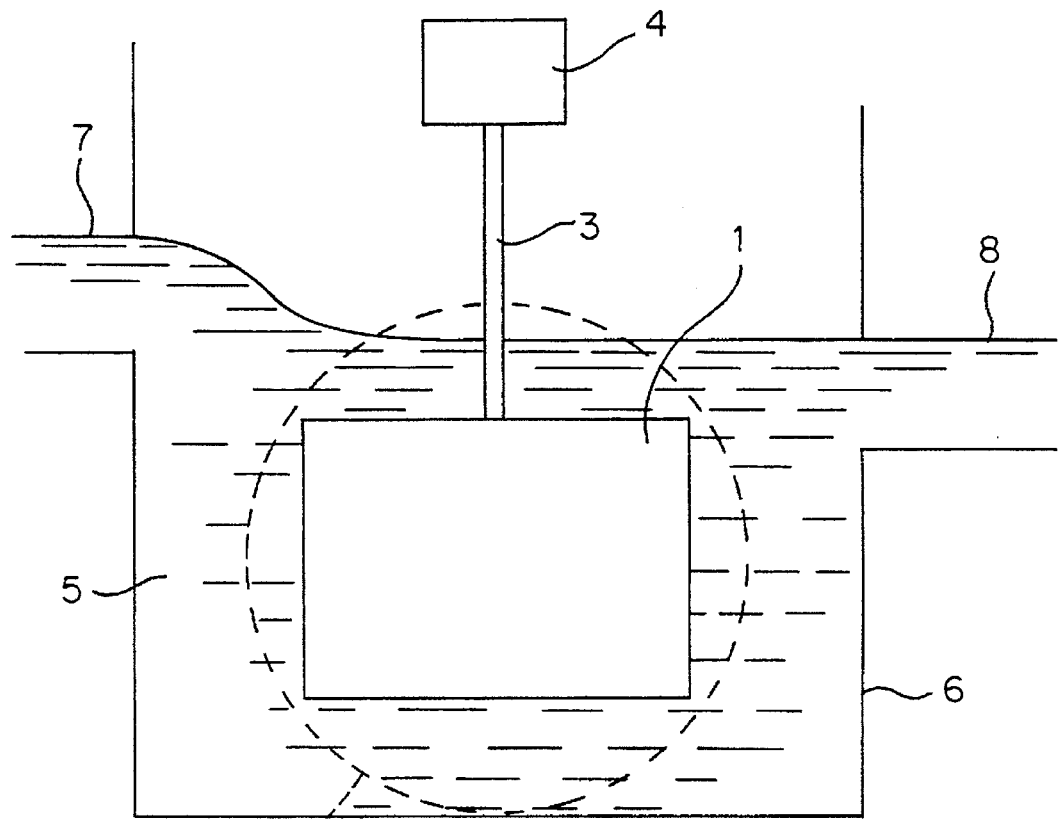
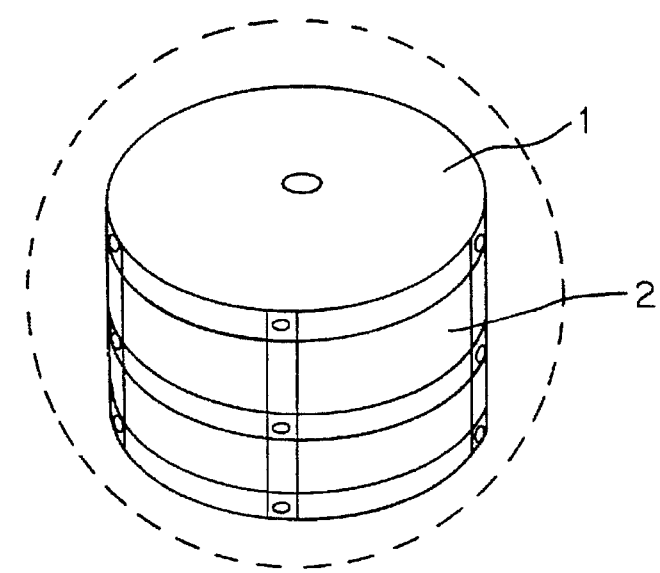

ANTI-FOULING PAINT COMPOSITION

BACKGROUND OF INVENTION

I. Field of Invention

The present invention relates to an anti-fouling paint generally used to top-coat exposed to a marine environment. These anti-fouling paints prevent the settlement and growth of marine organisms such as barnacles, algae and other organisms.

II. Description of the Prior Art

An anti-fouling coating is applied to control or prevent the attachment and growth of fouling organisms on surfaces immersed in sea-water. The growth of these organisms on submerged surfaces can lead to a dramatic rise in fuel costs. The build-up of fouling increases the frictional resistance of a ship's hull and drag effects resulting in considerably greater fuel consumption due to the increased weight and reduction in speed of the ship.

One of the successful anti-fouling paints developed in recent years is an anti-fouling paint using self-polishing copolymer. U.S. Pat. No. 3,167,473 and British Patent No. 1,457,590 describe self-polishing copolymers formed from triorganotin salt of an olefinically unsaturated carboxylic acid and at least one olefinically unsaturated co-monomer, into which other biocides/pigments are incorporated. The copolymer provides some of the biocidal action of the paint and hydrolyzes in sea water at a constant leaching rate.

However, ecological concerns surrounding organotin compounds released from tin-containing self-polishing copolymers makes the tin-based anti-fouling paints undesirable. Organotin has been implicated in failures of certain shellfish crops. Specifically, spawning failures and strange shell deformities have been noticed in adult oysters. It may be concluded that organotins are not only extremely toxic, but may further causes harmful side effects to a wide variety of non-target species, including both ecologically and commercially important organisms.

Therefore, recent advances in tin-free anti-foulant protection merit further investigation. Japanese Patent Publication No. 78/21885 describes a partially gelled binder made by mixing an acrylate copolymer containing acid and a metal ester such as zinc acetate and the like. However, such has inferior film-forming properties and storage stability, and therefore, exhibits problems such as easy cracking and peeling of the formed paint film due to crosslinking between resin binders caused by the metal ester. Moreover, application of such resin is rendered difficult because of its high viscosity.

Japanese Patent Application No. 81/165922 and Japanese Patent Application No. 83/196900 describe a class of polyester resins having a number of metal-ester bonds in their polyester backbone chains. Such resins are easily dissolved in an alkaline solution such as sea water at the metal-ester bonds of the polyester backbone and decomposed into small molecules. These decomposed small molecules cause the resin to have inferior film-forming qualities which makes the coating when it forms subject to easy cracking, peeling and flaking.

European Patent Application No. 204456 describes a hydrolysable resin which is used to improve the film-forming property of polyester resin having metal-ester bonds. The hydrolysable resin consists of a resin having at least one side chain bearing at least one terminal group of the formula:

wherein X represents

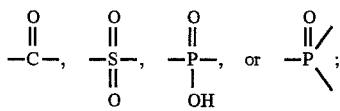

M is a metal selected from zinc, copper and tellurium; x is an integer of 1 or 2; R represents an organic acid residue selected from:

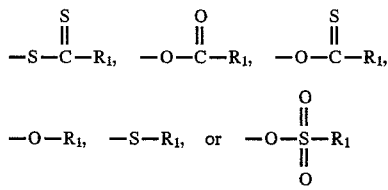

R1 is a monovalent organic residue.

Such resin may be prepared by a method wherein a polymerizable unsaturated monomer having the desired organic acid metal ester bond at an end portion is first prepared and copolymerized with other polymerizable unsaturated monomer(s).

However, this resin has some disadvantages: First of all, the viscosity of the resin binder containing a metal character is too high; such resin is also unstable during storage. In particular, it causes the increase of Tg and lacks durability because of its brittleness and tendency to crack easily in the form of paint film. The brittleness and cracking tendency result because the metal, M, in the hydrolysable resin has an extra d-orbital which forms a coordination complex with polar groups like the carbonyl group in the resin. The second disadvantage of the resin is that its application on the pre-coated tin-based anti-fouling paint is restricted by its poor recoatability, that is, poor adhesion with the tin-based anti-fouling paint. Its poor recoatability is caused by the hydrophobic property of an organic acid having a long-chain alkyl group. The third disadvantage is that the above mentioned resin erodes at too fast a rate during the initial period of erosion tests. This is because the resin has the ionic bonding character of metal which typically erode at a high rate in sea water compared to a tin-based resin which has a covalent bonding character. Finally, paint films containing this kind of resin often exhibit a flaking phenomenon due to the high erosion rate occurring during the initial period. Furthermore, in European Patent No. 204456 the acid value of the acid-polymer is limited up to 40 KOH mg/g. This value is inadequately low for obtaining long-term anti-fouling properties. The low acid value of a binder means that hydrolyzable portion of binder, after releasing the metal ester, is insufficient. Consequently, the paint surface is blocked by fouling organisms. As a result, the erosion rate after the initial period is dramatically decreased and then the paint loses its anti-fouling property.

WO 91/15546 and U.S. Pat. No. 5,199,977 describe metal-containing binders which comprise a substantially non-volatile amine, alcohol, urea, nitrile, or phenol as a ligand for inducing metal stability and low viscosity of the binder. The amine used in the coating composition preferably includes 12 to 20 carbon atoms such as a rosin amine. The use of amine as a ligand can control the erosion rate at the initial period and resolve problems of metal stability and high viscosity of the binder by forming a coordination complex with the metal. However, the use of the amine also results in low erosion due to its low solubility in water compared to that of a hydrolysable binder. In particular, using the amine as a ligand simply results in a dramatic increases of the erosion rate at the high pH of sea water, that is, an unstable erosion phenomenon wherein cracks appear in the paint film above the sea water line after long term exposure. The use of alcohol, urea, nitrile and phenol as a ligand results in poor water resistance which results in the flaking phenomenon characterized by a swelling of the paint film and color change thereof.

SUMMARY OF THE INVENTION

The objective of the present invention is to provide an anti-fouling paint composition which resolves the above-said conventional problems.

An anti-fouling paint composition according to the present invention comprises a self-polishing copolymer which contains at least one side chain bearing an organic half-ester or half-amide as one terminal group.

The organic half-ester or half-amide used in the present invention contains at least one ether group in the chain. The half-ester or half-amide is synthesized from reactions of acid anhydrides with organic compounds containing at least one ether group in the chain. The structure of the half-ester or half-amide is shown as follows:

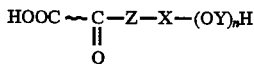

wherein, X and Y are independently —CH2, —CH2CH2—, —CH2CH2CH22—. or —CH2CH2CH2CH2—; Z is O or NH; n is an integer of 1, 2 or 3.

The anti-fouling paint disclosed in the present invention comprises a self-polishing copolymer which is prepared by reaction of a polymer containing an acid group at a side chain, a metal oxide and the above mentioned half-ester or half-amide.

This anti-fouling paint composition demonstrates improved anti-fouling properties by virtue of its constant erosion rate over a long term, storage stability and durability of the formed paint film. Moreover, it can be recoated on pre-coated tin-based anti-fouling paint by virtue of its excellent adhesion property.

BRIEF DESCRIPTION OF DRAWINGS

FIGS. 1 and 1A are schematic illustrations of the apparatus for the erosion rate test on the paints of Examples, wherein number 1 to 8 denote drum 1, panel 2, shaft 3, electric motor 4, flowing sea water 5, vessel 6, inlet 7 and outlet 8, respectively.

DETAILED DESCRIPTION OF INVENTION

In the present invention, the half-esters or half-amides containing at least one ether group are obtained by reaction of acid anhydrides with alcohols or amines containing at least one ether group in the chain. The synthetic pathway is shown in scheme I.

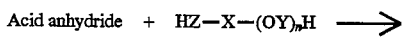

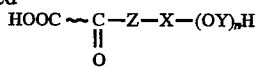

wherein, X and Y are independently —CH2—, —CH2CH2—, —CH2CH2CH2—, or —CH2CH2CH2CH2—; Z is O or NH; n is an integer of 1, 2 or 3.

<SCHEME I>

Alcohols which can be used in the present invention are monoether alcohols, diether alcohols and triether alcohols. Examples of monoether alcohol are methoxy methanol, ethoxy methanol, butoxy methanol, methoxy ethanol, butoxy ethanol and the like. Examples of diether alcohol are methoxymethoxy methanol, ethoxymethoxy methanol, butoxymethoxy methanol, methoxyethoxy methanol, ethoxyethoxy methanol, butoxyethoxy methanol, methoxybuthoxy methanol, ethoxybutoxy methanol, butoxybutoxy methanol, methoxymethoxy ethanol, ethoxymethoxy ethanol, butoxymethoxy ethanol, methoxyethoxy ethanol, ethoxyethoxy ethanol, butoxyethoxy ethanol, methoxybutoxy ethanol, ethoxybutoxy ethanol, butoxybutoxy ethanol, methoxymethoxy butanol, ethoxymethoxy butanol, butoxymethoxy butanol, methoxyethoxy butanol, ethoxyethoxy butanol, butoxyethoxy butanol, methoxybutoxy butanol, ethoxybutoxy butanol, butoxybutoxy butanol and the like. Examples of triether alcohol are ethoxyethoxyethoxy ethanol, butoxybutoxybutoxy butanol and the like.

Amines used in the present invention have ether linkage in the chain. Examples of amines are preferably 2-methoxy ethylamine, 3-ethoxy propylamine, amino acetaldehyde dimethylacetal, amino acetaldehyde diethyl acetal, 4-aminobutyraldehyde diethylacetal, 4-pentyloxyaniline, 4-hexyloxyaniline, 4-[2-(2-methoxy ethoxy)ethoxy] aniline, 1-methoxy-2-penoxyethylamine and the like.

Acid anhydrides used in the present invention are preferably succinic anhydride, maleic anhydride, phthalic anhydride, tetrahydrophthalic anhydride, citraconic anhydride, itaconic anhydride, hexahydrophthalic anhydride, 4-methyl tetrahydrophthalic anhydride, 4-methylhexahydrophthalic anhydride, 3-methyltetrahydrophthalic anhydride and the like.

The mole ratio of alcohol or amine containing an ether group and acid anhydride in the reaction for producing half-ester or half-amide is preferably from 1.0:1.0 to 2.0:1.0. The half-ester or half-amide can be prepared by bulk reaction without a solvent at 100°~150° C. for 4~8 hours.

The self-polishing copolymer used in the present invention is prepared by a reaction of a base polymer having an acid group at a side chain, a metal oxide or a metal hydroxide or a halogenated metal, and the above-mentioned half-ester or half-amide containing at least one ether group.

The self-polishing copolymer may be prepared by the following method: A base polymer containing an acid group, obtained by copolymerization of a polymerizable unsaturated organic acid monomer with at least one other polymerizable unsaturated monomer(s), is reacted with an above-mentioned half-ester or half-amide and metal oxide or metal hydroxide or halogenated metal. A mixture of (a) a base polymer containing an acid group; (b) a half-ester or a half-amide containing at least one ether group; and, (c) a metal oxide or metal hydroxide or halogenated metal, is heated and stirred at a temperature below 100° C. for 3~7 hours. The mole ratio of each component, (a): (b): (c), in the above-mentioned reaction is 0.75~0.5:1.25~2.0:1.0. According to the above-mentioned mole ratio, the excess metal ester which is not connected to the base polymer exists in the polymer solution after the reaction has been completed. The excess metal ester gives the polymer flexibility, that is, it acts as an internal plasticizer. In addition, it reduces viscosity and improves storage stability. For example, if the mole ratio is 1:1:1, the formed film will be too brittle and the viscosity of the polymer will be too high.

The base polymer containing an acid group used in the reaction is a copolymer of one or more olefinically unsaturated acid(s) such as acrylic acid, methacrylic acid, beta-carboxy ethyl acrylic acid, beta-carboxy ethyl methacrylic acid with at least one olefinically unsaturated comohomer. The olefinically unsaturated comonomers are selected from the group consisting of esters of acrylic acid and methacrylic acid, such as methyl acrylate, methyl methacrylate, ethyl methacrylate, butyl acrylate, butyl methacrylate, isobutyl methacrylate, hexyl acrylate etc.. Vinyl monomers such as vinyl chloride, styrene, vinyl acetate and vinyl butylate are also useful.

The self-polishing copolymer can be prepared by various known techniques of free radical polymerization, that is, bulk, solution etc. The polymerization may be carried out in a suitable organic solvent such as xylene, toluene, n-butanol, benzene, naphtha, butyl acetate, hexane etc. using a free radical initiator such as benzoyl peroxide, di-t-butyl peroxide, lauroyl peroxide or azobisisobutyronitrile etc.. Reaction temperatures are within the range of 40°~120° C. depending upon the catalyst system employed.

The metal component used in the present invention is at least one of zinc, copper and tellurium etc.. These materials are generally used in the form of oxide, hydroxide, chloride, nitrate, sulfate, carbonate and the like.

The self-polishing polymer used in the present invention has characteristic advantages as follows: First, the lone pair of electrons of the oxygen in the half-ester or half-amide containing at least one ether group improves the stability of metal by forming a coordination complex with the metal which then increases storage stability. In particular, the formation of the coordination complex is different from that resulting from the simple addition of a ligand such as that disclosed in WO 91/15546 and U.S. Pat. No. 5,199,977 because the coordination complex sites in the present invention are included in the polymer chain. This system can resolve the cracking, peeling and flaking problems found in other paint films during long-term exposure and the unstable erosion at the high pH of sea-water. Second, the newly developed self-polishing copolymer differs from the resin system, which uses an organic acid consisting of a hydrophobic long-chain alkyl group as a metal ester, to the extent that it is more effective at controlling excess erosion during the initial period and maintaining a constant long-term erosion rate. These characteristics give it excellent anti-fouling properties because the ether linkage in a half-ester or half-amide increases hydrophilicity in contrast to long-chain alkyl group. Third, the self-polishing polymer in the present invention increases the flexibility of the paint film by the introduction of ether group. This is compared to the general fact that the use of metal results in a brittle paint film which eventually cracks due to the increase of Tg and the reduction of flexibility of the paint film. Fourth, the self-polishing polymer improves adhesion with pre-coated tin-based anti-fouling paint, which a critically important factor in commercializing the product for market. Generally long-chain alkyl groups have poor adhesion properties due to low surface tension energy. But introduction of an ether linkage in a half-ester or half-amide increases surface tension energy and especially improves adhesion by interacting with the polar group on tin-based anti-fouling paint and pigments.

The anti-fouling paint composition according to the present invention contains a self-polishing polymer having the above-said advantages as vehicle. Any of the conventional additives a pigment, colorant, and the like may be added to formulate the anti-fouling paint composition. The partially soluble pigment is preferably a metalliferous pigment. The pigment is most preferably a copper or zinc compound, such as cuprous oxide, cuprous thiocyanate, zinc oxide, zinc dimethyl dithiocarbamate and the like. The paint composition can alternatively use an insoluble pigment in seawater such as titanium dioxide or ferric oxide. In addition, any anti-fouling agent or other toxic material can be added. Examples of such materials are bis(tributyltin) oxide, tributyltin fluoride. They may also contain thickeners such as bentonite and aerosil, solvents such as toluene, xylene, benzene, hexane, butyl acetate or alcohol etc..

PREPARATION OF HALF-ESTER CONTAINING ETHER LINKAGE (A)

EXAMPLE A-1

A solution of methyl tetrahydrophthalic arthydride (830 g, MW=166) and ethoxy ethanol (676.1 g, MW=90.15) was prepared in a 3L, round-bottom flask equipped with a reflux condenser and an overhead stirrer. The mixture was heated to maintain temperature at 110° C. to 120° C. for 3 hours. The end point of the reaction was measured by acid-value. The product having a solid content of 85 wt % (the excess ethoxy ethanol after reaction was considered a solvent) was obtained.

EXAMPLE A-2

A solution of methyl tetrahydrophthalic anhydride (830 g, MW=166) and butoxy ethanol (886.35 g, MW=118.18) was prepared in a 3L, round-bottom flask equipped with a reflux condenser and overhead stirrer. The mixture was heated to maintain temperature at 110° C. to 120° C. for 3 hours. The end point of the reaction was measured by acid-value. The product having a solid content of 82 wt % (excess ethoxy ethanol after reaction was considered a solvent) was obtained.

PREPARATION OF BASE POLYMERS CONTAINING ACID GROUP (B)

EXAMPLE B-1

Fifty parts of toluene and 50 parts of n-butanol were placed into and mixed in a 4-neck round-bottom flask equipped with an overhead stirrer, reflux condenser, and a dropping funnel. The mixture was then heated to 107° C. A solution of 25 parts of metacrylic acid, 30 parts of ethyl methacrylate, 15 parts of ethyl acrylate, 30 parts of methyl methacrylate and 5 parts of benzoyl peroxide in 50 parts of toluene was then dropwise added to the toluene-butanol mixture for 5 hours and then maintained at same temperature for 1 hour, yielding a polymer having a solid content of 39.8 wt % and a gardner bubble viscosity of J.

EXAMPLE B-2

Fifty parts of toluene and 50 parts of n-butanol were placed into a 4-neck round-bottom flask equipped with an overhead stirrer, a reflux condenser, and a dropping funnel.

The mixture was then heated to 107° C. To this mixture, a solution of 30 parts of metacrylic acid, 20 parts of butyl methacrylate, 30 parts of ethyl acrylate, 20 parts of methyl methacrylate and 5 parts of benzoyl peroxide in 50 parts of toluene was then dropwise added for 5 hours and thereafter maintained at the same temperature for 1 hour, yielding a polymer having a solid content of 39.9 wt % and a gardner bubble viscosity of U.

EXAMPLE B-3

Fifty parts of toluene and 50 parts of n-butanol were placed into a 4-neck round-bottom flask equipped with an overhead stirrer, reflux condenser, and a dropping funnel. The mixture was then heated to 107° C. To this mixture, a solution of 15 parts of beta-carboxy acrylic acid, 10 parts of metacrylic acid, 40 parts of ethyl metacrylate, 35 parts of butyl acrylate and 5 parts of benzoyl peroxide in 50 parts of toluene was dropwise-added for 5 hours and then maintained at the same temperature for 1 hour, yielding a polymer having a solid content of 39.2 wt % and a gardner bubble viscosity of H.

EXAMPLE B-4

Fifty parts of toluene and 50 parts of n-butanol were placed into a 4-neck round-bottom flask equipped with an overhead stirrer, reflux condenser, and a dropping funnel. The mixture was then heated to 107° C. To this mixture, a solution of 20 parts of beta-carboxy acrylic acid, 30 parts of ethyl acrylate, 25 parts of butyl metacrylate, 25 parts of methyl metacrylate and 5 parts of benzoyl peroxide in 50 parts of toluene was dropwise added for 5 hours and then maintained at the same temperature for 1 hour, yielding a polymer having a solid content of 39.3 wt % and a gardner bubble viscosity of K.

EXAMPLE B-5

Fifty parts of toluene and 50 parts of n-butanol were placed into a 4-neck round-bottom flask equipped with an overhead stirrer, reflux condenser, and a dropping funnel. The mixture was then heated to 107° C. To this mixture, a solution of 35 parts of metacrylic acid, 35 parts of ethyl acrylate, 15 parts of butyl acrylate, 15 parts of methyl methacrylate and 5 parts of benzoyl peroxide in 50 parts of toluene was dropwise added for 5 hours and then maintained at the same temperature for 1 hour, yielding a polymer having a solid content of 39.8 wt % and a gardner bubble viscosity of V.

EXAMPLE B-6

One-hundred and twenty parts of toluene and 30 parts of n-butanol were placed into a 4-neck round-bottom flask equipped with an overhead stirrer, reflux condenser, and a dropping funnel. The mixture was then heated to maintain the temperature at 110° C. To this mixture, a solution of 15 parts of acrylic acid, 60 parts of ethyl acrylate, 25 parts of 2-ethyl hexyl acrylate, and 2 parts of azobis isobutyronitrile was dropwise added for 5 hours and then maintained at the same temperature for 1 hour, yielding a polymer having a solid content of 39.8 wt %.

EXAMPLE B-7

One-hundred parts of toluene and 20 parts of n-butanol were placed into a 4-neck round-bottom flask equipped with an overhead stirrer, reflux condenser, and a dropping funnel. The mixture was then heated to maintain the temperature at 110° C. To this mixture, a solution of 26 parts of acrylic acid, 57 parts of ethyl acrylate, 17 parts of methyl methacrylate and 3 parts of azobis isobutyronitrile was dropwise added for 5 hours and then maintained at the same temperature for 1 hour, yielding a polymer having a solid content of 39.6 wt %.

PREPARATION OF SELF-POLISHING COPOLYMER (C)

EXAMPLE C-1

One-hundred parts of acid-polymer B-1, 58.2 parts of haigester A-1, 10 parts of toluene and 8 parts of n-butanol were placed into a 4-neck round-bottom flask equipped with an overhead stirrer and reflux condenser, and were then mixed for 10 minutes. To this mixture, 12.6 parts of zinc oxide was then slowly added and the resulting mixture was then heated at 80° C. and then maintained at such temperature for 5 hours, yielding a polymer, C-1, having a solid content of 44.7 wt % and a gardner bubble viscosity of P.

EXAMPLE C-2

One-hundred parts of acid-polymer B-1, 66.53 parts of half-ester A-2, 10 parts of toluene and 2 parts of n-butanol were placed into a 4-neck round-bottom flask equipped with an overhead stirrer and reflux condenser, and were then mixed for 10 minutes. To this mixture, 12.6 parts of zinc oxide was then slowly added and the resulting mixture was heated at 80° C. and then maintained at such temperature for 5 hours, yielding a polymer, C-2, having a solid content of 44.8 wt % and a gardner bubble viscosity of R.

EXAMPLE C-3

One-hundred parts of acid-polymer B-2, 77.39 parts of half-ester A-1, 15 parts of toluene and 10 parts of n-butanol were placed into a 4-neck round-bottom flask equipped with an overhead stirrer and reflux condenser, and were then mixed for 10 minutes. To this mixture, 16.21 parts of zinc oxide was then slowly added and the resulting mixture was then heated at 80° C. and then maintained at such temperature for 5 hours, yielding a polymer, C-3, having a solid content of 44.5 wt % and a gardner bubble viscosity of Q.

EXAMPLE C-4

One-hundred parts of acid-polymer B-2, 88.85 parts of half-ester A-2, 15 parts of toluene and 12 parts of n-butanol were placed into a 4-neck round-bottom flask equipped with an overhead stirrer and reflux condenser, and were then mixed for 10 minutes. To this mixture, 19.42 parts of cuprous hydroxide was then slowly added and the resulting mixture was then heated at 80° C. and then maintained at such temperature for 5 hours, yielding a polymer, C-4, having a solid content of 44.6 wt % and a gardner bubble viscosity of T.

EXAMPLE C-5

One-hundred parts of acid-polymer B-3 and 18.65 parts of half-ester A-1 were placed into a 4-neck round-bottom flask equipped with an overhead stirrer and reflux condenser, and were then mixed for 10 minutes. To this mixture, 4.83 parts of cuprous hydroxide was then slowly added and the resulting mixture was then heated at 80° C. and then maintained at such temperature for 5 hours, yielding a polymer, C-5, having a solid content of 44.9 wt % and a gardner bubble viscosity of O.

EXAMPLE C-6

One-hundred parts of acid-polymer B-3 and 21.32 parts of half-ester A-2 were placed into a 4-neck round-bottom flask equipped with an overhead stirrer and reflux condenser, and were mixed for 10 minutes. To this mixture, 4.83 parts of cuprous hydroxide was slowly added and the resulting mixture was then heated at 80° C. and then maintained at such temperature for 5 hours, yielding a polymer, C-6, having a solid content of 44.6 wt % and a gardner bubble viscosity of Q.

EXAMPLE C-7

One-hundred parts of acid-polymer B-4 and 27.17 parts of half-ester A-1 were placed into a 4-neck round-bottom flask equipped with an overhead stirrer and reflux condenser, and were mixed for 10 minutes. To this mixture, 5.78 parts of zinc oxide was slowly added and the resulting mixture was heated at 80° C. and then maintained at such temperature for 5 hours, yielding a polymer, C-7, having a solid content of 44.7 wt % and a gardner bubble viscosity of X.

EXAMPLE C-8

One-hundred parts of acid-polymer B-4 and 31.68 parts of a half-ester A-1 were placed into a 4-neck round-bottom flask equipped with an overhead stirrer and reflux condenser, and were then mixed for 10 minutes. To this mixture, 6.90 parts of cuprous hydroxide was slowly added and the resulting mixture was heated at 80° C. and maintained at such temperature for 5 hours, yielding a polymer, C-8, having a solid content of 44.9 wt % and a gardner bubble viscosity of Z1.

EXAMPLE C-9

One-hundred parts of acid-polymer B-5, 114.03 parts of a half-ester A-1, 32 parts of toluene and 14 parts of n-butanol were placed into a 4-neck round-bottom flask equipped with an overhead stirrer and reflux condenser, and were then mixed for 10 minutes. To this mixture, 22.08 parts of zinc oxide was then slowly added and the resulting mixture was heated at 80° C. and maintained at such temperature for 5 hours, yielding a polymer, C-9, having a solid content of 44.8 wt % and a gardner bubble viscosity of Z3.

EXAMPLE C-10

One-hundred parts of acid-polymer B-5, 130.39 parts of a half-ester A-2, 35 parts of toluene and 15 parts of n-butanol were placed into a 4-neck round-bottom flask equipped with an overhead stirrer and reflux condenser, and were then mixed for 10 minutes. To this mixture, 26.36 parts of cuprous hydroxide was then slowly added and the resulting mixture was heated to 80° C. and maintained at such temperature for 5 hours, yielding a polymer, C-10, having a solid content of 44.8 wt % and a gardner bubble viscosity of Z5.

PREPARATION OF THE COMPARATIVE POLYMER (CP)

COMPARATIVE EXAMPLE CP-1

One-hundred parts of an acid-polymer B-6, 20 parts of naphthenic acid (acid value 200 KOH mg/g) and 7 parts of cuprous oxide were placed into a 4-neck round-bottom flask equipped with a stirrer and a reflux condenser, and then mixed. The mixture was then heated to 120° C. and maintained at the same temperature for 2 hours, yielding a polymer, CP-1, having a solid content of 51.3 wt %.

COMPARATIVE EXAMPLE CP-2

One-hundred parts of acid-polymer B-7, 40.3 parts of oleic acid and 25.9 parts of zinc acetate were placed into a 4-neck round-bottom flask equipped with a stirrer and a reflux condenser, and then mixed. The mixture was then heated to 120° C. and maintained at the same temperature for 2 hours, yielding a polymer, CP-2, having a solid content of 55.3 wt %.

COMPARATIVE EXAMPLE CP-3

One-hundred parts of acid-polymer B-1, 25.78 parts of naphthenic acid, 11.35 parts of cuprous oxide and 20 parts of n-butanol were placed into a 4-neck round-bottom flask equipped with a stirrer and a reflux condenser, and then mixed. The mixture was then heated to 107° C. and maintained at the same temperature for 2 hours during which time any water formed was removed therefrom.

COMPARATIVE EXAMPLE CP-4

One-hundred parts of acid-polymer B-1, 25.78 parts of naphthenic acid, 11.35 parts of cuprous oxide and 20 parts of n-butanol were placed into a 4-neck round-bottom flask equipped with a stirrer and a reflux condenser, and then mixed. The mixture was then heated to 107° C. and maintained at the same temperature for 2 hours during which time any water formed was removed therefrom. The product solution was then cooled and then mixed with 40.7 parts of Rosin Amine D at 30° C. for 30 minutes.

COMPARATIVE EXAMPLE CP-5

One-hundred parts of acid-polymer B-2, 23.9 parts of versatic acid, 13.56 parts of cuprous oxide and 20 parts of n-butanol were placed into a 4-neck round-bottom flask equipped with a stirrer and a reflux condenser, and then mixed. The mixture was then heated to 107° C. and maintained at the same temperature for 2 hours during which time any water formed was removed therefrom.

COMPARATIVE EXAMPLE CP-6

One-hundred parts of acid-polymer B-2, 23.9 parts of versatic acid, 13.56 parts of cuprous oxide and 20 parts of n-butanol were placed into a 4-neck round-bottom flask equipped with a stirrer and a reflux condenser, and then mixed. The mixture was then heated to 107° C. and maintained at the same temperature for 2 hours during which time any water formed was removed therefrom. The product solution was then cooled and then mixed with 40.7 parts of Rosin Amine D at 30° C. for 30 minutes.

COMPARATIVE EXAMPLE CP-7

One-hundred parts of acid-polymer B-1, 25.78 parts of naphthenic acid, 11.35 parts of cuprous oxide and 20 parts of n-butanol were placed into a 4-neck round-bottom flask equipped with a stirrer and a reflux condenser, and then mixed. The mixture was then heated to 107° C. and maintained at the same temperature for 2 hours during which time any water formed was removed therefrom. The product solution was then cooled and then mixed with 25 parts of nonyl phenol at 30° C. for 30 minutes.

COMPARATIVE EXAMPLE CP-8

One-hundred parts of acid-polymer B-1, 25.78 parts of naphthenic acid, 11.35 parts of cuprous oxide and 20 parts of n-butanol were placed into a 4-neck round-bottom flask equipped with a stirrer and a reflux condenser, and then mixed. The mixture was then heated to 107° C. and maintained at the same temperature for 2 hours during which time any water formed was removed therefrom. The product solution was then cooled and then mixed with 14.19 parts of benzoic acid at 30° C. for 30 minutes.

The results of these examples in various paint formulations are stated in Tables I and II. The compositions indicated in Tables I and II are expressed in terms of percent by the weight of the materials used.

each of the test specimens is determined bi-weekly by measuring the thickness of the paint.

B. Rafting testing

Test panels are cut to a size of 300×150×3 mm. The panels are hung in suitable racks and submerged in local sea water using float rafts.

Fouling rating (FR)—Fouling is rated as follows:
0=no fouling
+=very slight fouling (5% of whole area)
++=slight fouling (20%)

TABLE I

| | Paint Composition | | | | | | | | | |
|---|---|---|---|---|---|---|---|---|---|---|
| Paint No. | P1 | P2 | P3 | P4 | P5 | P6 | P7 | P8 | P9 | P10 |
| Copolymer | C-1 | C-2 | C-3 | C-4 | C-5 | C-6 | C-7 | C-8 | C-9 | C-10 |
| | 35 | 35 | 35 | 35 | 35 | 35 | 35 | 35 | 35 | 35 |
| $CU_2O$ | 35 | 35 | 35 | 35 | 35 | 35 | 35 | 35 | 35 | 35 |
| ZnO | 10 | 10 | 10 | 10 | 10 | 10 | 10 | 10 | 10 | 10 |
| IOR | 7 | 7 | 7 | 7 | 7 | 7 | 7 | 7 | 7 | 7 |
| Xylene | 10 | 10 | 10 | 10 | 10 | 10 | 10 | 10 | 10 | 10 |
| MIBK | 3 | 3 | 3 | 3 | 3 | 3 | 3 | 3 | 3 | 3 |

TABLE II

| | Comparative Paint Composition | | | | | | | |
|---|---|---|---|---|---|---|---|---|
| Paint No. | P11 | P12 | P13 | P14 | P15 | P16 | P17 | P18 |
| Copolymer | CP-1 | CP-2 | CP-3 | CP-4 | CP-5 | CP-6 | CP-7 | CP-8 |
| | 35 | 35 | 35 | 35 | 35 | 35 | 35 | 35 |
| $CU_2O$ | 35 | 35 | 35 | 35 | 35 | 35 | 35 | 35 |
| ZnO | 10 | 10 | 10 | 10 | 10 | 10 | 10 | 10 |
| IOR | 7 | 7 | 7 | 7 | 7 | 7 | 7 | 7 |
| Xylene | 10 | 10 | 10 | 10 | 10 | 10 | 10 | 10 |
| MIBK | 3 | 3 | 3 | 3 | 3 | 3 | 3 | 3 |

EVALUATION METHOD OF ANTI-FOULING (A/F) PAINTS

A. Erosion rate determination

The paints are sprayed onto a test panel which has been previously coated with a tar urethane primer and a vinyl sealer. Each of the anti-fouling paints is applied to the test panels at a thickness of 150 μm. The panels are tested in an apparatus illustrated schematically in FIG. 1 of the drawing. The rotor rotates at a speed of 17 knots at 25° C. in sea water. After a conditioning period of 8 days, the erosion rate of +++=moderate fouling (50%)
++++=heavy fouling (100%)

C. Outdoor Exposure Test

Test panels are cut to a size of 300×150×3 mm. Paint each containing one of the various comparative examples are sprayed onto a test panel which has been previously coated with a tar urethane primer and a vinyl sealer. Each of the anti-fouling paints is applied to the test panels at a thickness of 150 μm. The panels are then immersed in sea water for 1 month and then exposed to the external elements for 4 months.

D. Adhesion Test

Test panels are cut to a size of 300×150×3 mm. Paints each containing one of the various comparative examples are sprayed onto a test panel which has been previously coated with a tar urethane primer, a vinyl sealer and a tin-based paint. The panels are measured by ASTM D3359 for adhesion test.

E. Storage Stability Test

Storage stability is determined by KU viscometry measurement. The viscosity is measured every 7 days at 60° C. and RH 55%.

TABLE III

| | Fouling Rating | | | | | |
|---|---|---|---|---|---|---|
| | 6 months | 12 months | 18 months | 24 months | 30 months | 36 months |
| P1 | 0 | 0 | 0 | 0 | 0 | + |
| P2 | 0 | 0 | 0 | 0 | 0 | + |
| P3 | 0 | 0 | 0 | 0 | 0 | 0 |
| P4 | 0 | 0 | 0 | 0 | 0 | 0 |
| P5 | 0 | 0 | 0 | 0 | + | + |
| P6 | 0 | 0 | 0 | 0 | + | + |
| P7 | 0 | 0 | 0 | 0 | 0 | + |
| P8 | 0 | 0 | 0 | 0 | 0 | + |
| P9 | 0 | 0 | 0 | 0 | 0 | 0 |
| P10 | 0 | 0 | 0 | 0 | 0 | 0 |
| P11 | ++ | +++ | +++ | ++++ | ++++ | ++++ |
| P12 | + | ++ | +++ | +++ | ++++ | ++++ |

TABLE III-continued

| | Fouling Rating | | | | | |
|---|---|---|---|---|---|---|
| | 6 months | 12 months | 18 months | 24 months | 30 months | 36 months |
| P13 | + | ++ | +++ | +++ | ++++ | ++++ |
| P14 | + | ++ | +++ | +++ | ++++ | ++++ |
| P15 | + | + | ++ | ++ | +++ | ++++ |
| P16 | + | + | ++ | ++ | +++ | +++ |
| P17 | + | ++ | +++ | +++ | ++++ | ++++ |
| P18 | + | ++ | +++ | +++ | ++++ | ++++ |

TABLE IV

Rotor Test - μm (25° C., speed: 17 knots)

| | 1 month | 2 months | 3 months |
|---|---|---|---|
| P1 | 4.8 | 4.4 | 4.6 |
| P2 | 4.6 | 4.4 | 4.2 |
| P3 | 5.3 | 5.1 | 5.2 |
| P4 | 5.1 | 5.0 | 5.0 |
| P5 | 4.5 | 4.3 | 4.2 |
| P6 | 4.2 | 4.0 | 4.0 |
| P7 | 4.5 | 4.3 | 4.3 |
| P8 | 4.3 | 4.1 | 4.0 |
| P9 | 7.3 | 7.0 | 6.8 |
| P10 | 7.0 | 6.8 | 6.6 |
| P11 | 7.0 | 3.0 | 1.0 |
| P12 | 13.8 | 15.2 | 16.3 |
| P13 | 10.4 | 11.5 | 13.2 |
| P14 | 6.2 | 4.3 | 2.1 |
| P15 | 14.0 | 12.0 | 12.5 |
| P16 | 10.0 | 7.0 | 3.0 |
| P17 | F | — | — |
| P18 | F | — | — |

*F: Flaking

TABLE V

Outdoor Exposure Test

| | 1 month | 2 months | 3 months | 4 months |
|---|---|---|---|---|
| P1 | G | G | G | G |
| P2 | G | G | G | G |
| P3 | G | G | G | G |
| P4 | G | G | G | G |
| P5 | G | G | G | G |
| P6 | G | G | G | G |
| P7 | G | G | G | G |
| P8 | G | G | G | G |
| P9 | G | G | G | G |
| P10 | G | G | G | G |
| P11 | C | C | C | C |
| P12 | C | C | C | C |
| P13 | C | C | C | C |
| P14 | G | G | C | C |
| P15 | C | C | C | C |
| P16 | G | G | C | C |
| P17 | G | C | C | C |
| P18 | G | C | C | C |

*G: GOOD,
C: CRACK

TABLE VI

Storage Stability Test unit: KU

| | 0 day | 7 days | 14 days | 21 days | 28 days | 35 days | 42 days |
|---|---|---|---|---|---|---|---|
| P1 | 92 | 94 | 94 | 94 | 94 | 94 | 94 |
| P2 | 89 | 89 | 89 | 90 | 92 | 92 | 92 |
| P3 | 94 | 95 | 94 | 96 | 95 | 95 | 96 |
| P4 | 92 | 93 | 94 | 94 | 94 | 96 | 96 |
| P5 | 85 | 88 | 87 | 88 | 88 | 88 | 87 |
| P6 | 86 | 86 | 86 | 88 | 88 | 88 | 88 |
| P7 | 94 | 94 | 94 | 94 | 95 | 96 | 96 |
| P8 | 95 | 95 | 94 | 93 | 94 | 95 | 96 |
| P9 | 96 | 95 | 96 | 98 | 98 | 98 | 98 |
| P10 | 95 | 97 | 97 | 97 | 98 | 98 | 98 |
| P11 | 101 | 120 | 128 | 135 | 140 | 142 | 144 |
| P12 | 120 | 148 | Gel | — | — | — | — |
| P13 | 125 | 140 | Gel | — | — | — | — |
| P14 | 120 | 123 | 124 | 126 | 126 | 126 | 127 |
| P15 | 118 | 129 | Gel | — | — | — | — |
| P16 | 110 | 112 | 113 | 113 | 113 | 114 | 114 |
| P17 | 117 | 127 | 145 | Gel | — | — | — |
| P18 | 119 | 129 | 150 | Gel | — | — | — |

TABLE VII

Adhesion Test

| P1 | G |
|---|---|
| P2 | G |
| P3 | G |
| P4 | G |
| P5 | G |
| P6 | G |
| P7 | G |
| P8 | G |
| P9 | G |
| P10 | G |
| P11 | B |
| P12 | B |
| P13 | B |
| P14 | B |
| P15 | B |
| P16 | B |
| P17 | B |
| P18 | B |

*G: >90%,
B: <50%

What is claimed is:

1. An anti-fouling paint comprising a self-polishing copolymer, said copolymer comprising the reaction product of (a) a base polymer containing at least one acid group; (b) a half-ester or half-amide containing at least one ether group in the chain; and (c) a metal oxide or metal-hydroxide or halogenated metal compound.

2. An anti-fouling paint composition according to claim 1, wherein the mole ratio of each component, (a):(b):(c) is 0.75~0.5:1.25~2.0:1.0.

3. An anti-fouling paint composition according to claim 1, wherein the base polymer containing an acid group is a copolymer of an olefinically unsaturated acid with at least one olefinically unsaturated comonomer.

4. An anti-fouling paint according to claim 1, wherein the half-ester or half-amide is synthesized from reaction of acid anhydrides with an organic compound containing at least one ether group in the chain.

5. An anti-fouling paint according to claim 4, wherein the mole ratio of the acid anhydride and the organic compound is from 1.0:1.0 to 1.0:2.0.

* * * * *